(12) United States Patent
Perry et al.

(10) Patent No.: US 7,160,067 B2
(45) Date of Patent: Jan. 9, 2007

(54) TOOL HOLDER ASSEMBLY

(75) Inventors: James Perry, Temperance, MI (US); Alexander Stoll, Plymouth, MI (US)

(73) Assignee: Ford Motor Company, Dearborn, MI (US)

( * ) Notice: Subject to any disclaimer, the term of this patent is extended or adjusted under 35 U.S.C. 154(b) by 71 days.

(21) Appl. No.: 10/710,458

(22) Filed: Jul. 13, 2004

(65) Prior Publication Data
US 2006/0013665 A1 Jan. 19, 2006

(51) Int. Cl.
  B23C 5/28 (2006.01)
  B23B 31/20 (2006.01)
(52) U.S. Cl. ............ 409/234; 409/232; 408/239 R; 279/43.5
(58) Field of Classification Search ........... 409/136, 409/134, 135, 137, 232, 233, 234; 408/57, 408/58, 59, 60, 61, 239 R, 240, 239 A; 407/11, 407/35; 175/393, 340; 279/51, 52, 53, 102, 279/103, 43.5, 43.6, 43.7, 43.8, 43.9, 49, 279/54
See application file for complete search history.

(56) References Cited

U.S. PATENT DOCUMENTS

| | | | | |
|---|---|---|---|---|
| 3,024,030 A | * | 3/1962 | Koch | 279/20 |
| 3,905,609 A | * | 9/1975 | Sussman | 279/20 |
| 3,945,752 A | | 3/1976 | Bennett | |
| 4,350,463 A | | 9/1982 | Friedline | |
| 4,381,825 A | * | 5/1983 | Radtke | 175/393 |
| 4,407,378 A | * | 10/1983 | Thomas | 175/340 |
| 4,487,271 A | * | 12/1984 | Pomeroy et al. | 408/20 |
| 4,567,954 A | * | 2/1986 | Voight et al. | 175/393 |
| 4,591,300 A | * | 5/1986 | Weiblen et al. | 408/59 |
| 4,640,652 A | * | 2/1987 | Rivera, Jr. | 409/136 |
| 4,642,005 A | | 2/1987 | Kondo et al. | |
| 4,878,548 A | * | 11/1989 | Ostertag et al. | 408/60 |
| 5,004,382 A | * | 4/1991 | Yoshino | 408/60 |
| 5,396,693 A | | 3/1995 | Lohner | |
| 5,593,258 A | | 1/1997 | Matsumoto et al. | |
| 5,702,211 A | | 12/1997 | Roemer et al. | |
| 5,788,249 A | | 8/1998 | Tagami | |
| 5,975,816 A | | 11/1999 | Cook | |
| 5,984,595 A | | 11/1999 | Mizoguchi | |
| 6,109,842 A | | 8/2000 | Cook | |
| 6,231,282 B1 | | 5/2001 | Yoneyama et al. | |
| 6,352,395 B1 | | 3/2002 | Matsumoto et al. | |
| 6,488,450 B1 | * | 12/2002 | Norris | 407/35 |
| 6,517,299 B1 | | 2/2003 | Lin | |
| 6,601,857 B1 | | 8/2003 | Richmond | |
| 6,923,604 B1 | * | 8/2005 | Sugata et al. | 409/136 |
| 2003/0103819 A1 | | 6/2003 | Sugata et al. | |
| 2003/0223837 A1 | | 12/2003 | Komine | |

FOREIGN PATENT DOCUMENTS

| | | |
|---|---|---|
| DE | 198 35 677 A1 | 1/2000 |
| DE | 198 43 695 A1 | 4/2000 |
| EP | 0 240 765 A2 | 3/1987 |
| EP | 1 275 469 B1 | 1/2003 |
| GB | 792373 | 3/1958 |

* cited by examiner

*Primary Examiner*—Dana Ross
(74) *Attorney, Agent, or Firm*—Raymond L. Coppiellie; Brooks Kushman P.C.

(57) ABSTRACT

A tool holder assembly having a cutting tool, a tool holder, and a sealing portion. The sealing portion is configured to inhibit fluid leakage between the cutting tool and the tool holder.

11 Claims, 3 Drawing Sheets

TOOL HOLDER ASSEMBLY

BACKGROUND OF INVENTION

1. Field of the Invention

The present invention relates to a tool holder assembly, and more particularly to a tool holder assembly having a sealing portion.

2. Background Art

Previously, tool holders incorporated a seal assembly disposed around the circumference of a cutting tool as described in U.S. Pat. No. 6,601,857.

SUMMARY OF INVENTION

According to one aspect of the present invention, a tool holder assembly is provided. The tool holder assembly includes a cutting tool, a tool holder, and a seal. The cutting tool has an end surface and a fluid passage. The tool holder has a conduit and a counterbore. The conduit is adapted to provide a fluid to the fluid passage. The counterbore is disposed coaxially with the conduit and is adapted to receive the cutting tool. The counterbore has a mating surface disposed around the conduit. The seal is disposed between the mating and end surfaces to inhibit fluid leakage.

The end surface or the mating surface may include a groove adapted to receive the seal. The end surface or the mating surface may include a male portion and a first female portion adapted to receive the seal. The mating surface or the end surface may include a second female portion adapted to receive the male portion. The seal, male portion, and first and second female portions cooperate to inhibit fluid leakage.

According to another aspect of the present invention, a tool holder assembly for a cutting tool is provided. The tool holder assembly includes a tool holder, and a sealing portion. The cutting tool has an end surface and a fluid passage. The tool holder has a conduit, an adjustment screw, and a counterbore. The conduit has a threaded interior section. The adjustment screw has a threaded body section and a flange section. The threaded body section is adapted to engage the threaded interior section. The flange section has a larger diameter than the threaded body section. The threaded body and flange sections cooperate to define an internal fluid passage. The counter-bore is disposed coaxially with the conduit and is adapted to receive the cutting tool. The sealing portion is configured to inhibit fluid leakage between the flange section and the end surface.

The adjustment screw may include a mating surface. The adjustment screw may include a connection tube disposed coaxially with the internal fluid passage at an end opposite the flange section. The internal fluid passage may include a chamfer disposed at an end proximate the flange section.

The sealing portion may include a seal. The end surface or the mating surface may include a groove adapted to receive the seal. The end surface may include a recessed portion disposed proximate the fluid passage.

According to another aspect of the present invention, a tool holder assembly is provided. The tool holder assembly includes a cutting tool, a tool holder, and a sealing portion. The cutting tool has an end surface and a fluid passage. The tool holder has a conduit and a counterbore. The conduit is adapted to provide a fluid to the fluid passage. The counterbore is disposed coaxially with the conduit and is adapted to receive the cutting tool. The counterbore has a mating surface disposed around the conduit. The sealing portion is configured to inhibit fluid leakage between the cutting tool and the tool holder.

The sealing portion may include a male portion disposed on the mating surface and a female portion disposed on the end surface. The sealing portion may include a male portion disposed on the end surface and a female portion disposed on the mating surface. The female portion may be adapted to receive the male portion.

DETAILED DESCRIPTION

Figure 1:
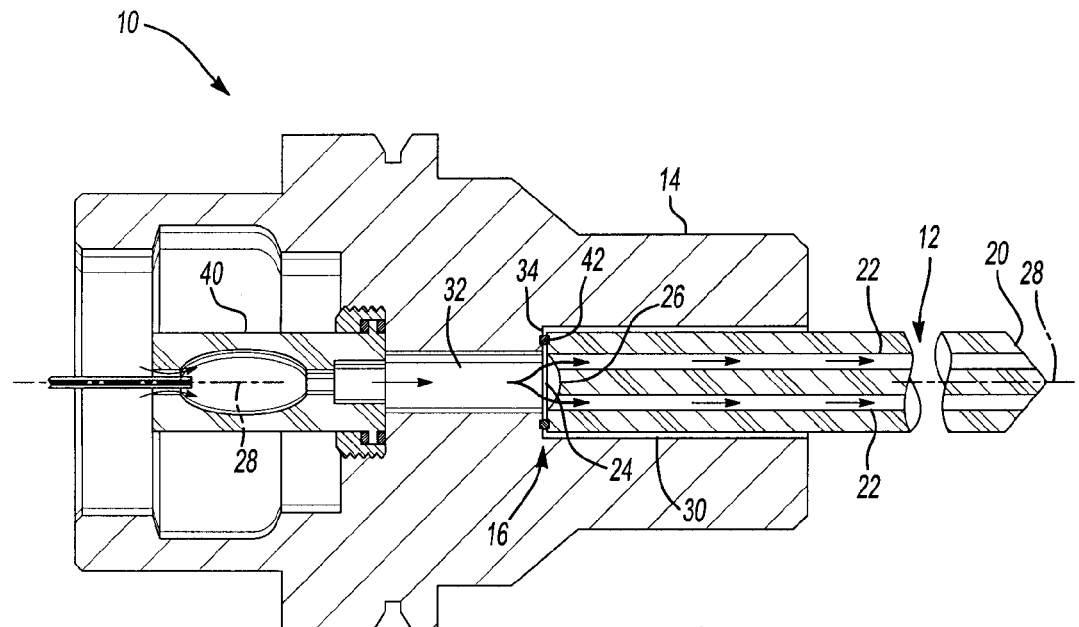
FIG. 1 is a section view of one embodiment of a tool holder assembly.

Referring to FIG. 1, one embodiment of a tool holder assembly 10 is shown. In this embodiment, the tool holder assembly 10 includes a cutting tool 12, a tool holder 14, and a sealing portion 16.

The cutting tool 12 includes one or more cutting surfaces 20, one or more fluid passages 22, and an end surface 24. The cutting tool 12 may have any suitable configuration and may be of any suitable type, such as a chamfer tool, counterbore, drill, mill, reamer, or tap.

The fluid passages 22 extend through the cutting tool 12 and are configured to provide a fluid proximate the cutting surface 20.

The end surface 24 is disposed at an end of the cutting tool 12 and may have any suitable configuration. For example, the end surface 24 may be tapered or have a generally planar configuration. Optionally, the end surface 24 may include a recessed portion 26. The recessed portion 26 may be formed in any suitable manner, such as by machining, sintering, or casting. In the embodiment shown, the recessed portion 26 is disposed proximate the fluid passages 22. In addition, the end surface 24 may have any suitable shape, such as a concave or convex hemispherical geometry.

The tool holder 14 is configured to hold the cutting tool 12 and rotate about an axis of rotation 28. More specifically, the tool holder 14 is configured to be connected to a spindle or other suitable device that is adapted to rotate the tool holder 14. The tool holder 14 may be of any suitable type, such as shrink fit holder or chuck. The tool holder 14 may be made of any suitable material, such as a polymeric material or a metal.

The tool holder 14 includes a counterbore 30 and a conduit 32. The counterbore 30 is adapted to receive the cutting tool 12 and includes a mating surface 34 disposed around the conduit 32. The counterbore 30 may have any suitable configuration for holding the cutting tool 12. Moreover, the cutting tool 12 may be secured to the tool holder 14 in any suitable manner, such as with one or more set screws as is known by those skilled in the art.

The conduit 32 is adapted to provide a fluid to the cutting tool 12. For example, the conduit 32 may be connected to a fluid supply pipe 40 adapted to provide any suitable fluid, such as a coolant or lubricant in the form of an aerosol, gas, or liquid, to the fluid passages 22. The conduit 32 may have any suitable configuration. In the embodiment shown, the conduit 32 is disposed concentrically with the axis of rotation 28 and has a smaller diameter than the counterbore 30.

The sealing portion 16 is disposed between the end surface 24 and the mating surface 34. The sealing portion 16 is configured to inhibit fluid leakage from the conduit 32 into the gap between the outside diameter of the cutting tool 12 and the inside diameter of the counterbore 30. The sealing portion 16 may have any suitable configuration as will be described in more detail below. In the embodiment shown, the sealing portion 16 includes a seal 42 disposed between the mating and end surfaces 24,34.

Figure 2:
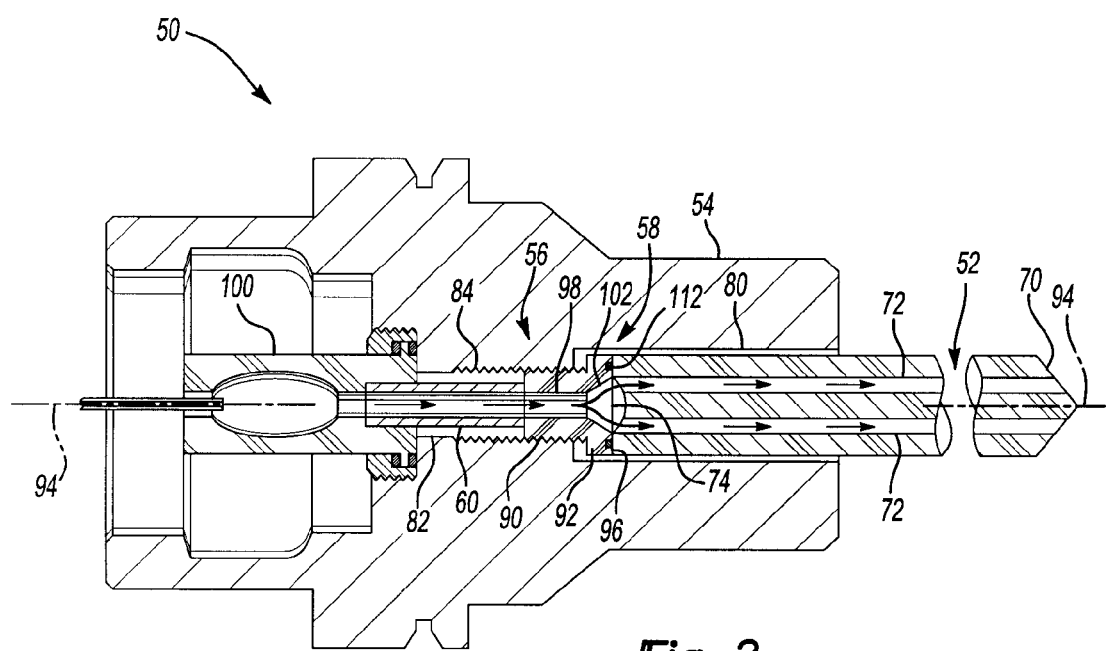
FIG. 2 is a section view of another embodiment of the tool holder assembly.

Referring to FIG. 2, another embodiment of the tool holder assembly 50 is shown. In this embodiment, the tool holder assembly 50 includes a cutting tool 52, a tool holder 54, an adjustment screw 56, and a sealing portion 58. In addition, a connection tube 60 may be incorporated with the tool holder 54 or the adjustment screw 56.

The cutting tool 52 may include one or more cutting surfaces 70, one or more fluid passages 72, and an end surface 74 as previously described. For convenience, similar cutting tools are depicted in FIGS. 1 and 2.

The tool holder 54 includes a counterbore 80 and a conduit 82. At least a portion of the conduit 82 may include a threaded interior section 84.

The adjustment screw 56 includes a threaded body section 90 and a flange section 92. The adjustment screw 56 may be made of any suitable material, such as a polymeric material or a metal.

The threaded body section 90 is adapted to engage the threaded interior section 84. The threaded body section 90 and threaded interior section 84 cooperate to help position the cutting tool 52 along an axis of rotation 94. More specifically, the threaded body section 90 may be rotated and screwed into or out of the conduit 82 to alter the position of the adjustment screw 56 and cutting tool 52.

The flange section 92 is disposed adjacent to the threaded body section 90. The flange section 92 includes a mating surface 96 disposed adjacent to the cutting tool 52. The flange section 92 may have any suitable configuration. In the embodiment shown, the flange section 92 has a larger diameter than the threaded body section 90. In addition, the mating surface 96 may have any suitable configuration for receiving and/or mating with the end surface 24. For example, the mating surface 96 may be curved or rounded to seal tangentially against the end surface 24 and to facilitate run-out adjustments, such as with one or more radially-oriented adjustment screws incorporated in the tool holder 14.

The threaded body section 90 and flange section 92 cooperate to define an internal fluid passage 98. The internal fluid passage 98 may be disposed coaxially with the conduit 82.

The connection tube 60 is disposed in the threaded interior section 84 between the adjustment screw 56 and a fluid supply pipe 100. The connection tube 60 may have any suitable configuration and may be made of any suitable material, such as a polymeric material or a metal. In the embodiment shown, the connection tube 60 has a similar diameter as the internal fluid passage 98.

The connection tube 60 may be integrally formed with the adjustment screw 56 or the fluid supply pipe 100. Alternatively, the connection tube 60 may be a separate component that is attached to the tool holder 54, adjustment screw 56, or fluid supply pipe 100 in any suitable manner, such as by welding, fasteners, or an adhesive.

Optionally, the adjustment screw 56 may include a chamfer 102 disposed in at least a portion of the flange section 92. Alternatively, the chamfer 102 may extend through the flange section 92 and into a portion of the threaded body section 90. The chamfer 102 is adapted to improve fluid flow and fluid distribution to the fluid passages 72. More particularly, the chamfer 102 and centrifugal forces present when the tool holder assembly 50 is rotated cooperate to direct fluid to the fluid passages 72.

The tool holder assemblies 10,50 described above may be employed with any suitable machining process or fluid delivery system. For example, the tool holder assemblies 10,50 may be used with a minimum quantity lubrication (MQL) system. In an MQL system, a pressurized lubricating fluid, such as an oil mist, is provided through the tool holder 14,54 and cutting tool 12,52 to the cutting surfaces 20,70. Fluid delivery is controlled to provide just enough lubrication to sustain the machining process.

Consequently, it is desirable to provide adequate sealing between the cutting tool 12,52 and the tool holder 14,54 to inhibit fluid leakage and improve tool life and process performance.

Referring to FIGS. 3A–3H, various embodiments of the sealing portion 16,58 are shown. These sealing portion embodiments may be incorporated with the tool holder assemblies 10,50 shown in FIGS. 1 and 2.

Referring to FIGS. 3A–3D, four embodiments of the sealing portion 16,58 are shown. In these embodiments, the sealing portion 16,58 includes at least one seal 42,112. The seal 42,112 may have any suitable configuration, such as a gasket or washer. In FIGS. 3A–3D, the seal is configured as an O-ring. The seal 42,112 may be made of any suitable material, such as a polymeric material, elastomeric material, metal, or combinations thereof.

The seal 42,112 is disposed between the end surface 24,74 of the cutting tool 12,52 and the mating surface 34,96. The mating surface 34,96 may be disposed on the tool holder 14 as shown in FIG. 1 or on the adjustment screw 56 as shown in FIG. 2. The seal 42,112 is at least partially compressed to provide a fluid-tight seal between the end surface 24,74 and the mating surface 34,96.

The end surface 24,74 and mating surface 34,96 may have any suitable configuration as shown in FIGS. 3A–3D.

Figure 3A:
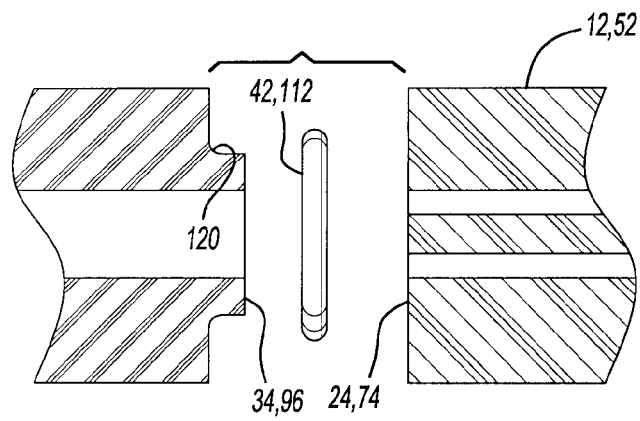
FIGS. 3A–3H are exploded section views of various embodiments of sealing portions of the tool holder assembly.

In FIG. 3A, the end surface 24,74 has a generally planar configuration and the mating surface 34,96 has a contoured portion 120 adapted to receive the seal 42,112.

Figure 3B:
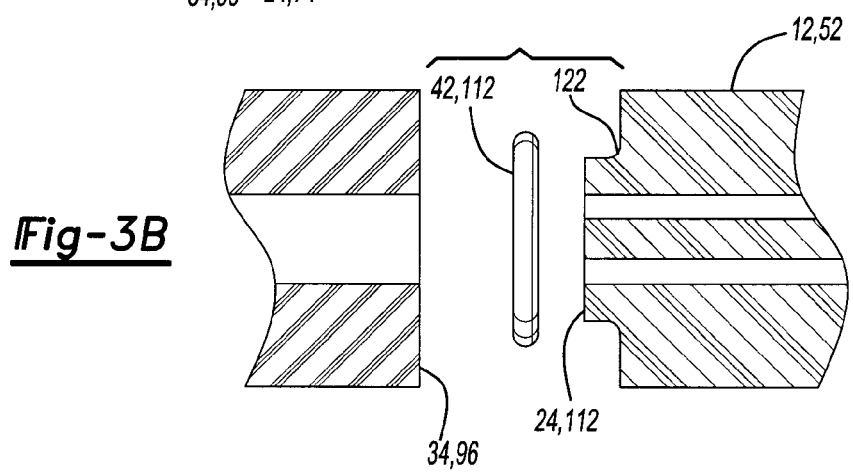

In FIG. 3B, the mating surface 34,96 has a generally planar configuration and the end surface 24,74 has a contoured portion adapted 122 to receive the seal 42,112.

Figure 3C:
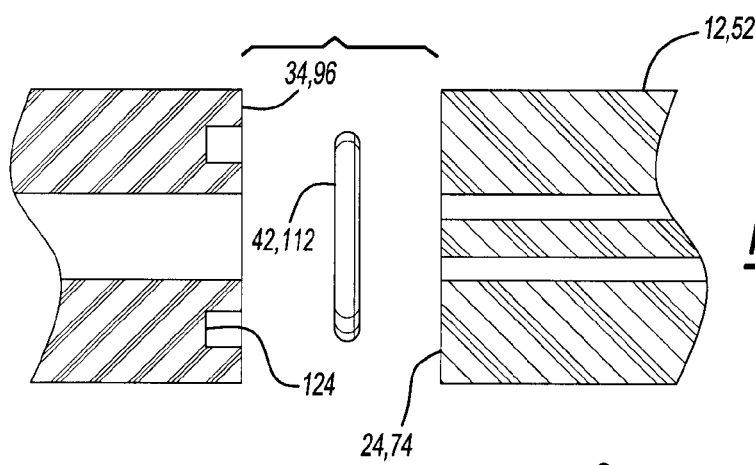

In FIG. 3C, the end surface 24,74 has a generally planar configuration and the mating surface 34,96 has a groove 124 adapted to receive the seal 42,112.

Figure 3D:
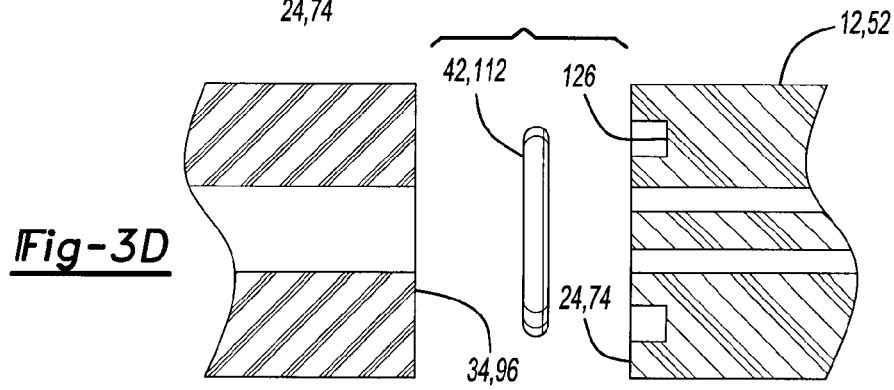

In FIG. 3D, the mating surface 36,96 has a generally planar configuration and the end surface 24,74 has a groove 126 adapted to receive the seal 42,112.

The contoured portions 120,122 or grooves 124,126 may have any suitable cross-sectional shape or surface configuration, such as rectangular, triangular, trapezoidal, curved, ribbed, dimpled, curved, or any combinations thereof. Moreover, the contoured portions 120,122 or grooves 124,126 may be disposed in any suitable location, such as concentrically with the conduit 32,82.

Figure 3E:
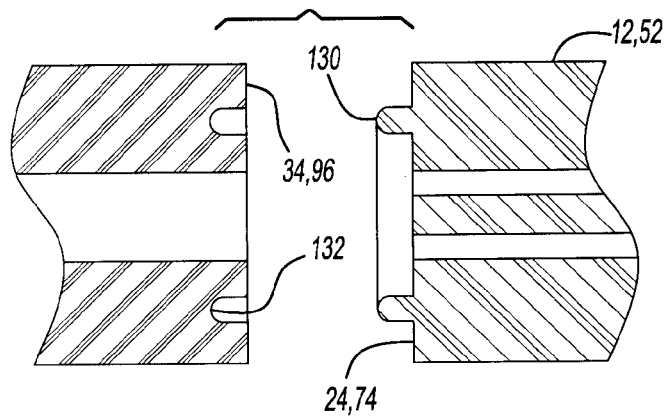
Figure 3F:
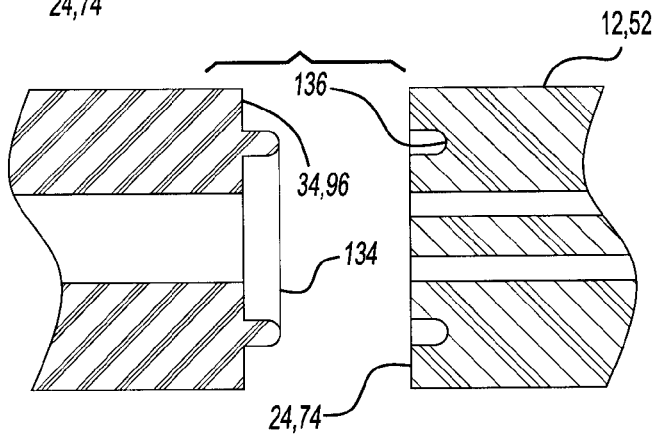

Referring to FIGS. 3E and 3F, two embodiments of a sealing portion 16,58 are shown that do not incorporate a separate seal.

In FIG. 3E, the end surface 24,74 includes an annualar protrusion, or male portion 130. The mating surface 34,96 includes an annular groove or female portion 132 that is adapted to receive the male portion 130.

In FIG. 3F, the mating surface 34,96 includes a protrusion or male portion 134. The end surface 24,74 includes a female portion 136 that is adapted to receive the male portion 134.

The male portions 130,134 and female portions 132, 136 cooperate to inhibit fluid leakage. The male 130,134 and female portions 132,136 may have any suitable configuration and may be disposed in any suitable location, such as concentrically with the conduit 32,82.

Figure 3G:
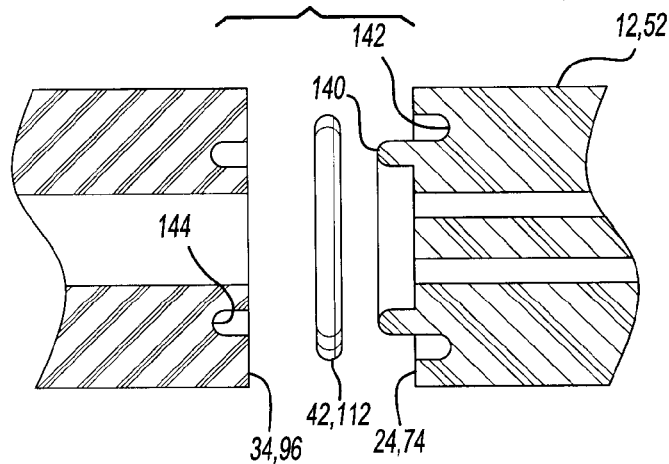
Figure 3H:
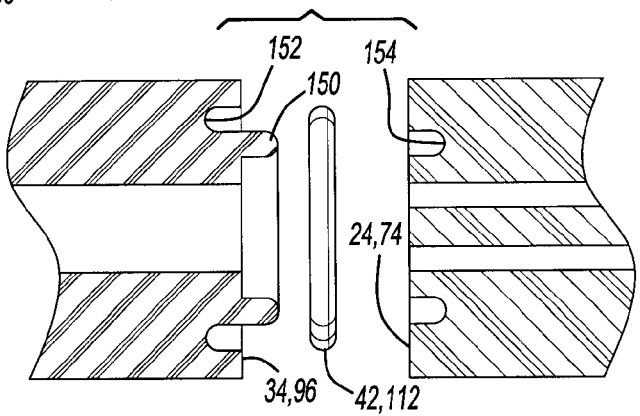

Referring to FIGS. 3G and 3H, two embodiments of a sealing portion 16,58 are shown that combine various features of the embodiments depicted in FIGS. 3A–3F. More specifically, these embodiments incorporate a seal as well as male and female portions.

In FIG. 3G, the end surface 24,74 includes a male portion 140 and a first female portion 142 adapted to receive the seal 42,112. The mating surface 34,96 includes a second female portion 144 adapted to receive the male portion 140. The seal 42,112, male portion 140 and first and second female portions 142,144 cooperate to inhibit fluid leakage.

In FIG. 3H, the mating surface 34,96 includes a male portion 150 and a first female portion 152 adapted to receive the seal 42,112. The end surface 24,74 includes a second female portion 154 adapted to receive the male portion 150. The seal 42,112, male portion 150 and first and second female portions 152,154 cooperate to inhibit fluid leakage.

The male portion 140,150, first female portion 142,152, and second female portion 144,154 may have any suitable configuration and may be disposed in any suitable location, such as concentrically with the conduit 32,82. In addition, the first female portion 142,152 and seal 42,112 may be disposed either inside the male portion 140,150 or outside the male portion 140,150 as shown in FIGS. 3G and 3H.

The sealing portions in FIGS. 3A–3H provide a heat resistant seal to withstand fluid delivery pressures and facilitate the efficient delivery of a lubricant or other fluid to the cutting tool. Moreover, the life of the cutting tool and quality of the machined part is improved as a result of the delivery of an adequate volume of fluid to the cutting surfaces. Moreover, process throughput is improved since cutting parameters, such as feed rate, may be increased since sufficient lubrication is provided to the cutting surface.

While the best mode for carrying out the invention has been described in detail, those familiar with the art to which this invention relates will recognize various alternative designs and embodiments for practicing the invention as defined by the following claims.

The invention claimed is:

1. A tool holder assembly for a cutting tool having an end surface and a fluid passage, the tool holder assembly comprising:
    a tool holder including:
        a conduit having a threaded interior section;
        an adjustment screw having a threaded body section adapted to engage the threaded interior section and a flange section having a larger diameter than the threaded body section, the threaded body and flange sections defining an internal fluid passage disposed coaxially with the conduit;
        a counterbore disposed coaxially with the conduit and adapted to receive the cutting tool; and
    a sealing portion configured to inhibit fluid leakage between the flange section and the end surface.

2. The tool holder assembly of claim 1 wherein the internal fluid passage further includes a chamfer disposed at an end proximate the flange section.

3. The tool holder assembly of claim 1 wherein the adjustment screw further comprises a mating surface and the sealing portion further comprises a seal.

4. The tool holder assembly of claim 3 wherein the end surface further comprises a groove adapted to receive the seal.

5. The tool holder assembly of claim 3 wherein the mating surface further comprises a groove adapted to receive the seal.

6. The tool holder assembly of claim 3 wherein the mating surface includes a male portion and a first female portion adapted to receive the seal and the end surface includes a second female portion adapted to receive the male portion such that the seal, male portion, and first and second female portions cooperate to inhibit fluid leakage.

7. The tool holder assembly of claim 3 wherein the end surface includes a male portion and a first female portion adapted to receive the seal and the mating surface includes a second female portion adapted to receive the male portion such that the seal, male portion, and first and second female portions cooperate to inhibit fluid leakage.

8. The tool holder assembly of claim 1 wherein the adjustment screw further comprises a mating surface and the sealing portion further comprises a male portion disposed on the mating surface and a female portion disposed on the end surface that is adapted to receive the male portion.

9. The tool holder assembly of claim 1 wherein the adjustment screw further comprises a mating surface and the sealing portion further comprises a male portion disposed on the end surface and a female portion disposed on the mating surface that is adapted to receive the male portion.

10. The tool holder assembly of claim 1 wherein the adjustment screw further comprises a connection tube disposed coaxially with the internal fluid passage at an end opposite the flange section.

11. The tool holder assembly of claim 1 wherein the end surface further comprises a recessed portion disposed proximate the fluid passage.

* * * * *